United States Patent [19]

Kneib et al.

[11] 4,439,839
[45] Mar. 27, 1984

[54] DYNAMICALLY PROGRAMMABLE PROCESSING ELEMENT

[75] Inventors: Kristine N. Kneib, La Jolla; George Vensko, Ramona, both of Calif.

[73] Assignee: International Telephone and Telegraph Corporation, New York, N.Y.

[21] Appl. No.: 295,432

[22] Filed: Aug. 24, 1981

[51] Int. Cl.³ .............................................. G06F 3/04
[52] U.S. Cl. ................................................. 364/900
[58] Field of Search ........................ 364/900 MS File

[56] References Cited

U.S. PATENT DOCUMENTS

| | | | |
|---|---|---|---|
| 4,041,472 | 8/1977 | Shah et al. | 364/900 |
| 4,159,882 | 7/1979 | Sanders, Jr. et al. | 364/900 |

Primary Examiner—Raulfe B. Zache
Attorney, Agent, or Firm—John T. O'Halloran

[57] ABSTRACT

A dynamically programmable processing element (DPPE) is disclosed which element has the utility in a digital processing system which requires complicated arithmetic procedures to be implemented. The DPPE device is a special purpose computer which essentially has a program bus for transmitting and receiving program data from an external source. A data bus is also provided which bus can transmit or receive digital data. Coupled between the buses are input and output registers or buffers which are capable of storing transmitted or received data propagating on either of said buses. A program memory has an input coupled to said program bus and means coupling the output of the program memory to the program bus. A data memory has an addressable input means coupled to the program bus and an output coupled to the data bus. Based on the orientation of the buses and the memories, the program memory can receive program information or data from an external source and data from the data memory can be transferred to the external source. In this respect the DPPE can be reprogrammed in real time by the external source. The DPPE can also execute program instructions by fetching them from the external source as well as executing its own program instructions as stored in its program memory. The structure and format of the DPPE enables it to interface with an external source such as a microprocessor to assist and perform program instructions, as well as to perform arithmetic operations on data from the microprocessor and to communicate with the microprocessor after completion of the various routines.

15 Claims, 9 Drawing Figures

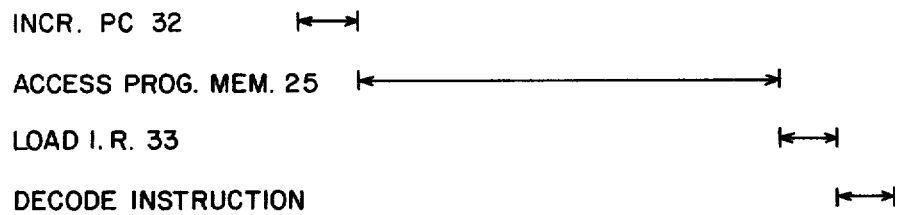
*Fig. 1B*
(i) INSTRUCTION FETCH
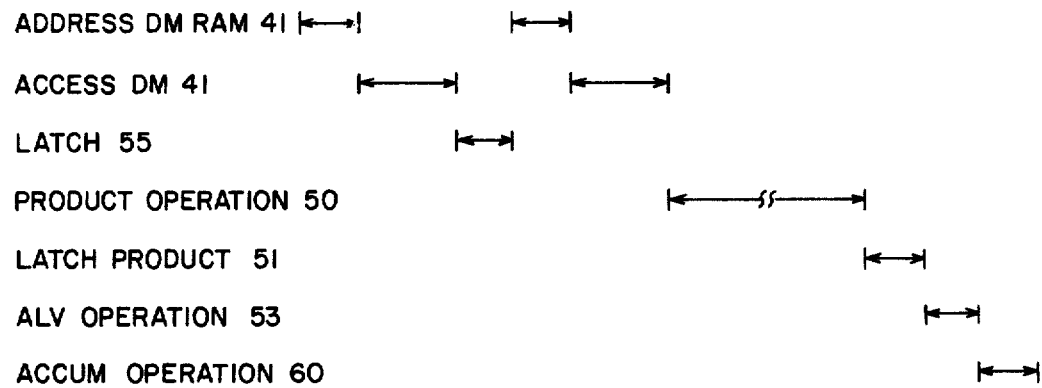
(ii) DOT PRODUCT LOOP
(iii) WRITE INTO EXTERNAL MEMORY CYCLE 30
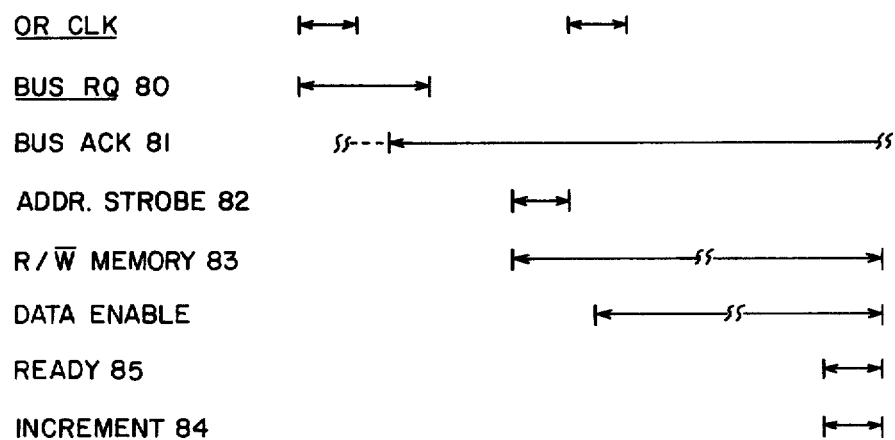

DYNAMICALLY PROGRAMMABLE PROCESSING ELEMENT

BACKGROUND OF INVENTION

This invention relates to digital signal processing systems to enable the digital processing of voice, sonar, radar, video, communication and other analog signals, and more particularly to such a system and architecture to enable the processing of voice analog signals for purposes of narrowband, secure communication and for voice recognition.

The field of digital signal processing is complicated and many patents exist which attempt to process analog voice signals to permit bandwidth reduction to enable digitized, encrypted representation of the analog voice signal to be sent over conventional telephone lines. The same algorithms, such as linear predictive coding, can be used as the front-end processing which extracts features from the analog voice which can then be used in a voice recognition system.

Typical of certain prior art approaches is U.S. Pat. No. 4,070,709 entitled "PIECEWISE LINEAR PREDICTIVE CODING SYSTEM" issued on Jan. 24, 1978 to J. E. Roberts, et al. This patent describes a linear predictive coding (LPC) system that utilizes multichannel signal processing and reduced sampling rates. The input analog signal is divided by filters into multiple, continguous, substantially equal bandwidth signal components and each component is digitized and processed by a separate standard LPC transmit receive system.

Linear predictive coding (LPC) is used to model the vocal tract with a multisection all pole filter to synthesize the voice on the receiving end. The filter coefficients are derived by analyzing the voice at the transmitter by one of several techniques: the covariance method, the autocorrelation method, the lattice method and others. All of these techniques require arithmetic-intensive programs to run in real time. In the covariance method a 10×10 covariance matrix is generated and the filter coefficients are derived by inverting the matrix by Cholesky decomposition. In addition to the filter coefficients the pitch period of the speech is derived by, typically, autocorrelation of the digitized voice samples, or by an absolute magnitude difference function AMDF.

In digital signal processing architectures presently implemented, the various functions have required multiple, interconnected integrated circuits. The program, or control, memory, data memory, arithmetic logic unit, multiplier, I/0 circuitry, and timing and control have required one or more integrated circuits for implementation. As fabrication technology has improved, higher density packaging capability has allowed more circuit elements to be integrated in a single integrated circuit chip. Until recently, this has been done by developing more capability within the major types of devices. In memory devices, this has taken the course of more storage capability. In arithmetic elements, this has taken the course of allowing more bits to be processed in parallel. Recently, there is some development in the direction of incorporating more of these basic functions onto one chip. However, in devices that are currently in development which are integrating the various functions onto a single chip the program memory is implemented in ROM. This requires multiple devices in applications where the total program cannot be fitted into the available ROM, which also requires additional external devices to provide the means of connecting several processing elements.

In the current state of the art in semiconductor fabrication, the limitations in implementing the voice algorithms are in limitations of on chip memory capacity rather than processing speed.

The present invention relates to an improved processor which processor can be dynamically programmed by external means in a simple and rapid manner.

The dynamically programmable processor element can be reprogrammed in real time, by a host processor or by accessing local external memory using circuits and an on-board load program. In a stand-alone configuration where there are no other processor elements, the element can also execute instructions by fetching them from external memory. This option is useful where the length of the instruction sequence is shorter than the time required to load the sequence into internal program memory where execution is faster.

DESCRIPTION OF THE PREFERRED EMBODIMENT

A dynamically programmable processing element (DPPE) particularly adapted for use in processing digital signals and having the ability to receive data and program instructions from an external source comprises a program bus for transmitting and receiving program data from said external source, a data bus for transmitting and receiving digital data, input and output registers coupled between said data bus and said program bus for storing transmitted or received data present on either bus, a program memory having an input coupled to said program bus and means coupling the output of said program memory to said program bus, a data memory having addressable input means coupled to said program bus and an output coupled to said data bus, whereby said program memory can receive program information from an external source as well as data from said data memory transferred to said external source.

BRIEF DESCRIPTION OF THE INVENTION

FIG. 1b is a series of timing diagrams depicting the sequence of operation for the DPPE.

DETAILED DESCRIPTION OF THE INVENTION

Figure 1A:
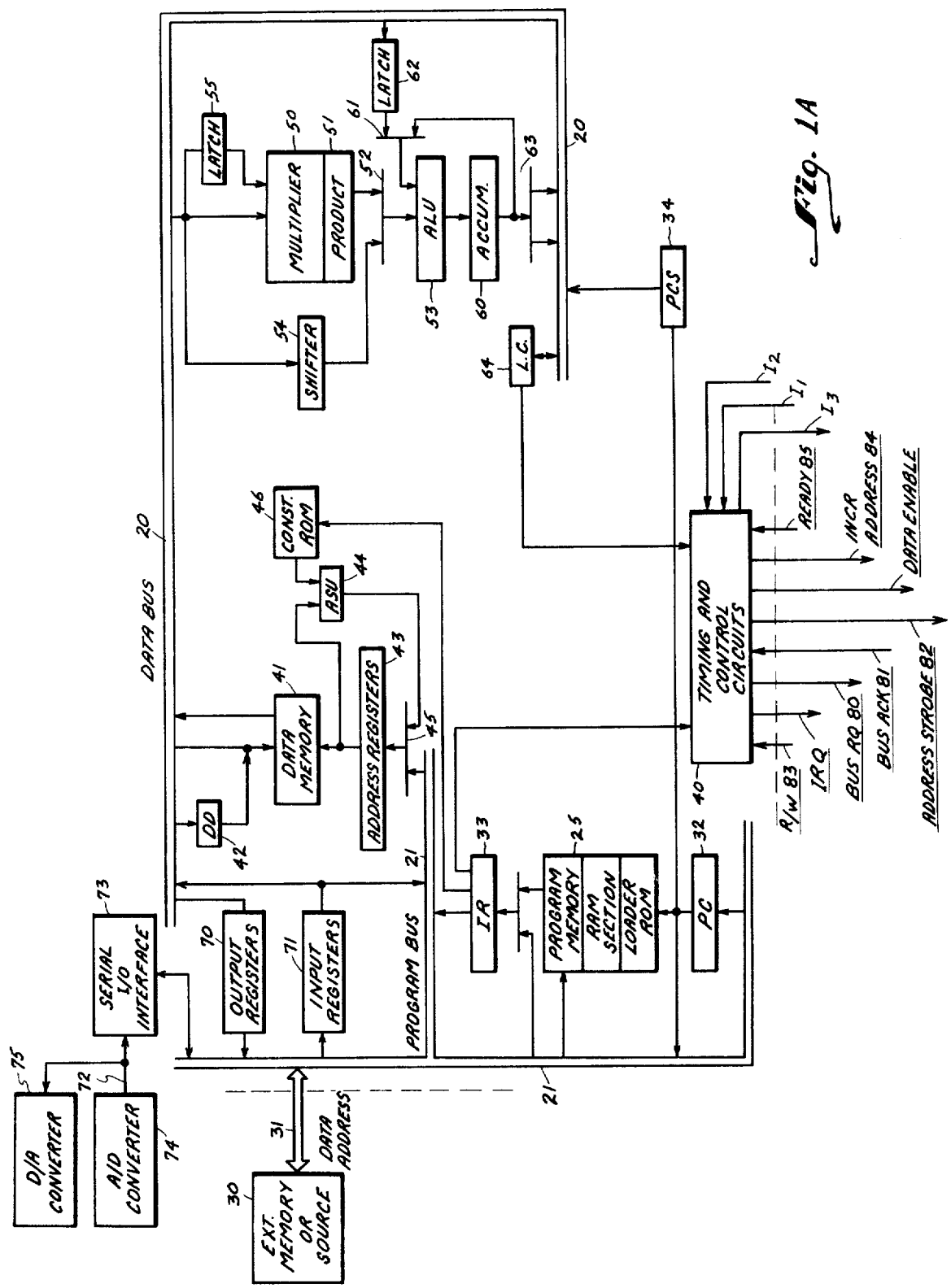
FIG. 1a is a block diagram of a dynamically programmable processing element (DPPE) according to this invention.

Referring to FIG. 1a there is shown a block diagram of a dynamically programmable processing element (DPPE) according to this invention.

Before proceeding with a detailed explanation of the operation it is indicated that the DPPE is fabricated as a single chip or integrated circuit. The DPPE is capable of being reprogrammed from an external memory or source and therefore is extremely useful to applications involving real time digital signal processing.

The DPPE includes a first data bus 20, which is a bidirectional bus capable of receiving and transmitting data to the various modules connected thereto.

A second program bus 21 receives and transmits program data to the various modules connected thereto.

Coupled to the program bus 21 is a program memory 25. The program memory 25 consists of a read only loader memory (ROM) in which the loader program is stored and a random access memory section (RAM) which is a program memory.

The loader program as stored in the ROM loader memory controls the input of program instructions from an external memory 30 which is coupled to the data/address bus 31 interfacing with the program bus 21. The RAM contains the program instructions to enable the DPPE to control on-chip functions as will be explained. While the loader memory is described as a ROM it can also be an EPROM which is an electrical programmable read only memory. Examples of such memories are well known in the art and reference is made to a text entitled "Computer Architecture" by C. C. Foster (1976), Van Nostrand & Co.

Coupled to the program memory 25 is a program counter (PC) 32. The PC 32 has an input coupled to the program bus 21 to receive start addresses of program commands from the external memory or source 30. An output of the PC 32 is also coupled to the program bus 21 and to a program counter save register (PCS) 34. The PCS 34 is a register and is coupled to the data bus 20 to permit the value in the program counter to be stored in data memory 41 in nested call routines.

The output of the program memory 25 is coupled to the instruction register (IR) 33 to enable the storage of program instructions and thus allow the following instruction to be fetched while the instruction in IR33 is being executed and to interface with the timing and control circuit 40 to generate the timing and control signals to execute the instruction in IR33.

A data memory 41 is shown having one input coupled directly to the data bus 20 and another input coupled to the data bus 20 via a data delay register (DD) 42. The data memory 41 is addressed by an address register circuit 43 which has an input coupled to the program bus 21. Two operands can be fetched from the data memory 41 in a single instruction as obtained from the address register 43.

The data delay register (DD) 42 allows a single instruction delay in writing data back into the memory 41 which data was accessed from the data memory 41 in the previous cycle. This delay as implemented by the delay register 42 is useful in shifting samples of data during convolution operations.

As indicated, the address register 43 will enable two operands to be fetched from the data memory 41 in a single instruction. The address stored in the register 43 can be changed by the adder/subtractor unit (ASU) 44. The ASU 44 has an input coupled to the output of the address register 43 with an output coupled to a gate 45 which has another input coupled to the program bus 21. The ASU 44 is operative to change the address stored in the address registers which can be done by a constant amount as determined by numerical values stored in a constant ROM 46. In this manner, the contents of the address register can be modified by adding or subtracting from the address the value stored in the ROM 46 which is addressed from the instruction.

The memory organization of the data memory 41 allows parallel operand fetch or timing control allowing serial operand fetch to provide two operands at the output of the memory in a single instruction. Many techniques are known and also available.

As indicated, the data output from the memory 41 is coupled to the data bus 20. Also shown coupled to the data bus 20 is an input of a high speed multiplier 50. The multiplier 50 as connected to the data bus 20 can receive two operands as an input. The multiplier 50 outputs a product in the output register 51 during one instruction cycle. The output of the product register 51 is coupled to a gate 52 having an output coupled to an arithmetic logic unit (ALU) 53 which performs binary arithmetic and boolean logic operations on two input operands. Thus the data from the data bus 20 is also applied to a shift register 54 which can couple the data directly into the ALU 53 via gate 52.

The latch circuit 55 is a register which stores one operand at one input of the multiplier 50 to enable the multiplier 50 to receive the next operand for providing the product to be stored in register 51. The output operands to the ALU 53 are selected by the program memory instruction to be the data memory outputs. Thus these outputs may be shifted in shifter 54 by a specified amount or may be the multiplier product via register 51 or the contents of the accumulator 60 via gate 61.

The output of the ALU 53 is applied to the input of an accumulator circuit 60. The output from the accumulator 60 can be directed to the ALU 53 via a gate 61. The latch 62 operates to apply the contents of the data bus 20 directly to the ALU 53 under program control.

As shown in FIG. 1, the output of the accumulator 60 is applied to a gate 63 where it can be impressed directly on the data bus 20. It is understood that gates as 61, 63 are controlled by the program instructions and selected by the program steps to determine the data received by the ALU 53. Thus the ALU 53 can receive two data memory outputs in one instruction cycle as via shifter 54 and latch 62.

The accumulator 60 is loaded with the output of the ALU 53 at the end of each instruction cycle. Thus the accumulator output can be stored in the data memory at the end of the instruction cycle via gate 63.

Also shown coupled to the data bus 20 is a loop counter (LC) 64. The LC 64 is provided to handle iteration loops. A special memory instruction enables the LC 64 to be tested within the iterations without special instructions.

Also shown are output registers 70 having inputs coupled to the data bus 20 and outputs coupled to the program bus 21. Input registers 71 have inputs from the program bus 21 with outputs coupled to the data and program bus. These registers 70 and 71 comprise the input output circuits (I/0) for communicating with external processors, memories or other circuits as 30 which are connected to the data/address bus 31.

Also shown in FIG. 1 is a high speed serial port 72 which is coupled to a serial input output interface 73. The interface 73 is a bidirectional register for receiving serial digital data at its input, which input may be coupled to an analog to digital converter 74 or for transmitting serial digital data out which output may be coupled to a digital to analog converter 75. The parallel I/O of the interface 73 is coupled to the program bus 21.

The output and input registers or buffers 70 and 71 are configured in a stacked array and as such store data or program instructions from the data/address bus 31. In this manner, the registers can store data or program incoming from and data outgoing to the data/address bus 31. In order to provide such operation, tasks are assigned to the DPPE by writing a block of instructions into the input register 71 and the external control device will interrupt operation of the DPPE with an interrupt signal placed on the interrupt lead $I_2$ coupled to the timing and control 40. When a task is complete, a block of status information is stored in the output buffer 70 of the DPPE and the input lead $I_3$ is output to the external device. The memory addressable interface controls 70 and 71 of the DPPE allow access to the data memory 41. In this way a microprocessor can be coupled to the data/address bus 31. The interface eliminates the need for a direct memory access channel (DMA) or other external circuitry.

In any event, when the data and address bus 31 is shared by the use of the input and output registers which are addressed by the memory, the on board data and program memories 41 and 25 can be loaded from an external memory 30 or the contents of the data memory 41 can be written into the external memory 30. The program for loading the instructions into the RAM section of memory 25 is stored in the loader ROM program memory.

With the above description in mind, the timing and control circuit operates as follows: A low level on the bus request lead 80 (Bus $\overline{RQ}$) indicates that the DPPE requests access to the data/address bus 31. A low level on the bus knowledge lead 81 (Bus $\overline{ACK}$) enables the DPPE external memory interface. For example, in a microprocessor environment this signal is generated by address decode logic from the microprocessor. The address strobe on lead 82 (ADDR strobe) allows the address to be valid on the data/address bus and on a transition of this strobe the address is loaded into the address counter associated with the memory. The read/write lead 83 (R/$\overline{W}$) allows data to be written into memory as output data from the DPPE becomes available on the bus or for data to be written into the DPPE. The Data Enable 86, together with R/$\overline{W}$ allows data to be written into memory.

The Increment lead 84 will increment the address or when combined with the address strobe 82 will decrement the address. This is used to increment or decrement the address counter associated with the external memory 30. The Ready signal on lead 85 is used to extend the Data Select pulse (for read or write for the memory) from the DPPE to accommodate slow memory devices as 30. These memory addressable interface controls allow the DPPE to load data into the data memory 41 and the program memory 25 or to output data into the external memory 30 as well as to allow the DPPE to operate from an external program memory.

FIG. 1b provides examples of timing sequences for (i) instruction fetch (ii) loop of dot product and (iii) write into external memory operations. Thus as shown in FIG. 1b, in order to fetch an instruction there is shown a first time slot for incrementing the program counter (PC32). The next period is assigned for accessing the program memory 25. After memory 25 has been accessed the instruction register IR33 is loaded with the instruction and the remaining period is employed to decode the instruction.

The second timing sequence is referred to as a dot product loop. In this sequence, two operands from the data memory are retrieved where they are multiplied and the product is accumulated with the previous result. In the timing sequence shown the data memory is addressed and then accessed and data is then transmitted to latch 55. The memory is now addressed again and again accessed. In the next sequence the product of the two operands is obtained via multiplier 50. This product is then stored in latch 51 and the ALU 53 operation then follows which in turn is followed by the accumulator 60 operation.

The third sequence depicted determines the write sequence into the external memory cycle. This sequence depicts the timing sequence on the various leads emanating from the timing and control circuit 40 to implement an external memory write cycle.

Thus as can be ascertained from FIGS. 1a and 1b, the sequence of operation of the modules depicted and described will enable the DPPE to operate with its internal components or to operate from an external program.

In order to control the timing sequences one can specify timing pulses or timing signals which are to be implemented by the wave form generator 40 as depicted in FIG. 1a. The operation of such a generator is well-known in the art. The major concern of timing and control is to assure that there is enough time for addressing the memory and accessing the data stored therein. In this manner, with the above timing sequence as shown in FIG. 1b in mind, the designer can now formulate the necessary clock signals or timing wave forms to cause the sequential operations as described above.

Thus the ability of the DPPE to stand alone enables the flexibility of program change downloaded from the program memory or data into the memory to be updated via the DPPE. The program for loading instructions into the RAM program memory is stored in the loader ROM program memory. Since the DPPE is capable of being reprogrammed in real time, it can perform different arithmetic and control functions, the sum of which exceed the program and data memory capacity of the device. The DPPE thus described can also execute instructions by fetching from an external memory as 30. This feature is useful where the length of the instruction sequence is shorter than the time required to load the sequence into an internal program memory having a faster execution.

The timing and control 40 of FIG. 1 is essentially a wave form generator which operates a series of counters and suitable gates. The clock provides the timing control for the various modules shown in FIG. 1 as is well known. The various interrupts shown such as $I_1$, $I_2$ and $I_3$ are highs or lows indicating a first or a second level to enable an interrupt operation.

In any event, the structure and circuitry necessary for implementing the timing and control 40 is known to those skilled in the art and many examples of control circuits for microprocessors can be employed in the timing and control circuitry 40.

Figure 2:
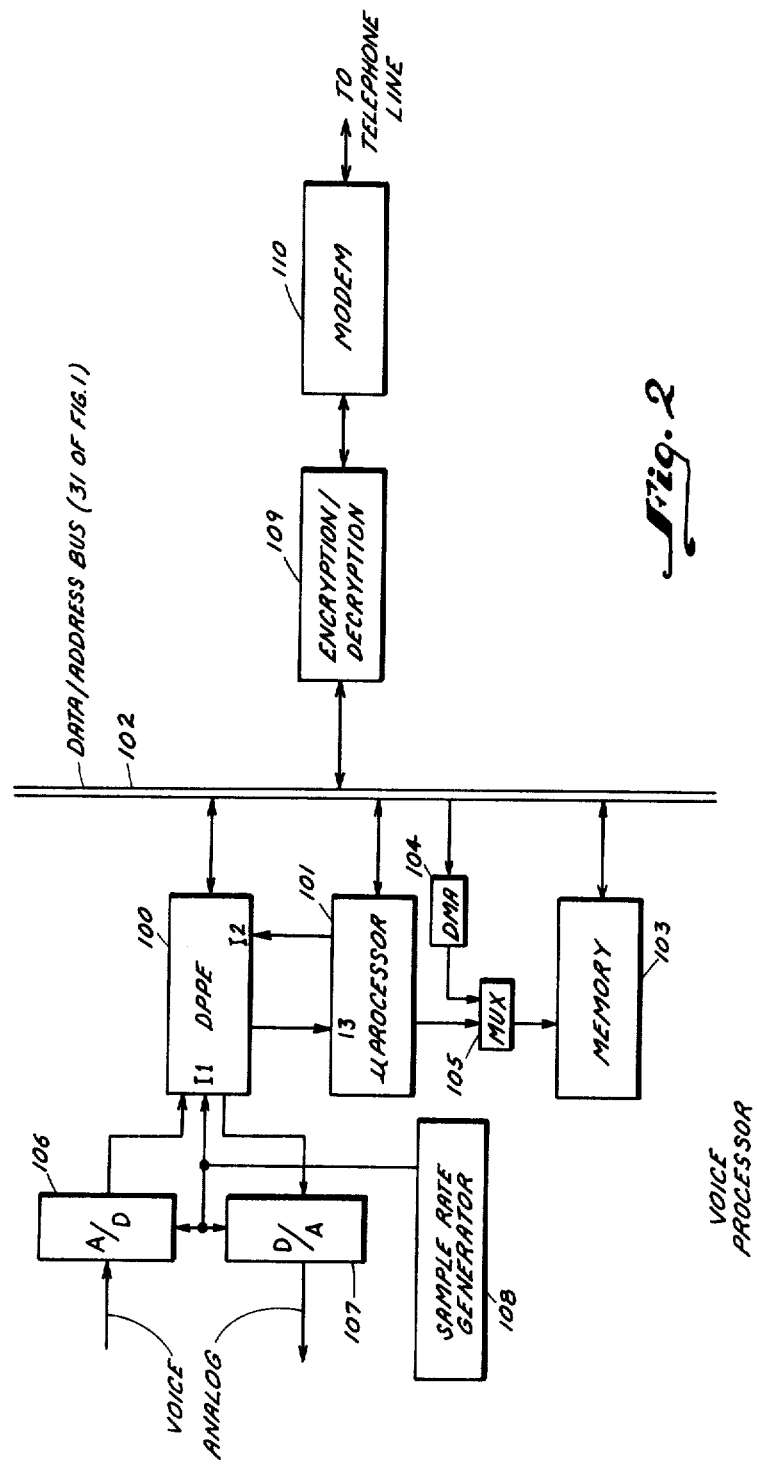
FIG. 2 is a block diagram of a voice terminal employing a DPPE and a microprocessor to provide an LPC voice processing system.

Refering to FIG. 2, there is shown a block diagram of a DPPE 100 as that device depicted in FIG. 1. The DPPE 100 is used in a narrowband voice terminal which implements a linear prediction code (LPC) in the voice processor. The voice terminal then encrypts/decrypts the reduced rate digital data stream and transmits this over the conventional telephone line via a modem.

Essentially, as shown in FIG. 2, the voice processor consists of a microprocessor 101 which is coupled to the data address bus of the DPPE 100. The interrupt leads $I_1$ to $I_3$ are shown in FIG. 1. Also coupled to the bus 102 is a memory 103 and a direct memory access (DMA) device 104 which device is coupled to the memory via a multiplexer 105 (MUX). The multiplexer 105 having its other input coupled to the data bus of the microprocessor 101.

Essentially, the arrangement of the microprocessor 101, the DMA 104, the microprocessor 105 and the memory 103 are typical prior art arrangements which configurations are well-known in the prior art. See for example, a text entitled MICROPROCESSORS AND MICROCOMPUTOR SYSTEMS by G. V. Rao (1978), Van Nostrand Reinhold Company. In any event, together with this arrangement the DPPE 100 offers distinct advantages in operation with the microprocessor 101 and associated structure in a narrowband voice terminal.

Also shown in FIG. 2 is an analog to digital converter 106 which is coupled to the serial I/O interface input as is the digital to analog converter (D/A) 107. A sample rate generator 108 is shown coupled to the A/D converter 106 and to the D/A converter 107 and has an input coupled to the $I_1$ interrupt. The bus 102 is coupled to an encryption/decryption circuit 109 which is coupled to the modem 110 having its input output terminal coupled to the telephone line.

In the circuit shown the A/D converter receives a voice input and converts the analog voice signals to a 12 bit digital representation at a 8 KHZ sampling rate. The sampling rate is supplied by the sample rate generator 108 which essentially is a counter. The technique of providing analog to digital conversion of voice signals is well-known and there are many structures for providing the A/D converter as well as the D/A converter. See a text entitled ANALOG TO DIGITAL/DIGITAL TO ANALOG CONVERSION TECHNIQUES by D. F. Hoeschele, Jr. (1968), John Wiley & Sons, Inc.

Sample rate generator 108 also generates the interrupt $I_1$ which is coupled to the DPPE 100. In response to the interrupt, the DPPE 100 reads the digital word from the A/D converter 106. As can be seen from FIG. 1, this word is impressed upon the program bus 21 and the word is transferred by the program instructions to the data memory to be operated on by the program contained in the DPPE.

The DPPE 100 and the microprocessor 101 are used to implement an LPC algorithm which in the transmit direction reduces the data rate of the digitized voice signal 96,000 bps (bits per second) to 2,400 bps.

As indicated above, the LPC algorithms are also well-known in the art and many examples of such algorithms exist. See for example, an article entitled SPEECH ANALYSIS AND SYNTHESIS BY LINEAR PREDICTION OF THE SPEECH WAVE by B. S. Atal and S. L. Haneuer, Journal of the Acoustical Society of America 50, 2 (1971), pages 637 to 655.

In the receive direction the 2,400 bps receive signal is reconstructed by the LPC algorithm to the format equivalent to the transmitter input of 12 bit words at a 8 KHZ rate. These words are applied on the data bus 20 to the output register 70 where they are directed to the D/A converter 107 in response to the 8 KHZ interrupt $I_1$.

As one skilled in the art knows LPC algorithms are extremely complicated and in the structure shown in FIG. 2 the algorithm is partitioned between the DPPE 100 and the microprocessor 101 in a manner to take advantage of the best features of both types of architectures. The microprocessor's conventional architecture is suitable for execution of program length intensive routines, the DPPE 100 with its on board program and data memories and with the ALU and multiplier as shown in FIG. 1, as well as the parallelism of execution of various arithmetic and program control steps is suitable for implemention of arithmetic intensive operations requiring fast execution. As should be clear, current state of the art devices incorporating program memory, data memory, ALU multiplier and control logic use read only memories (ROM) for the program memory. Current fabrication technology limits the memory capacity of these devices where all of the digital signal processing functions cannot be incorporated on one device. However, the speed of operation of these devices is such that a great deal of spare time is available in such devices which cannot be utilized. The current invention allows the full utilization of the processing capability of such an architecture by allowing the device to be reprogrammed quickly after a given program has been executed and to do this several times within a LPC frame of 22.5 milliseconds to execute many routines in one DPPE. In current art techniques three or more devices as three or more microprocessors would be required because of program memory space limitations.

The reprogramming of the DPPE 100 is controlled by the microprocessor 101 which sets up the DMA 104 to address the memory 103 on a cycle stealing basis to transfer programs from the memory 103 to the DPPE 100 and to also transfer data between the memory 103 and the DPPE 100 in both directions.

Communication between the DPPE 100 and the microprocessor 101 is by means of the bus 102. The microprocessor 101 assigns tasks to the DPPE 100 by writing a block of instructions into the DPPE input buffer or register 71. The DPPE 100 is interrupted by means of the interrupt $I_2$. At the completion of the task by the DPPE 100 it enters a block of status information into the DPPE output buffer or register 70 and interrupts the microprocessor with the interrupt $I_3$.

Referring to FIG. 3, there is shown flow charts for the input/output operations relating to these interrupts. These flow charts show how the DPPE 100 and the microprocessor 101 communicate in general and are not specific to LPC. In applications where both of the A/D input or the D/A output are not required to be connected to the DPPE, the interrupt $I_1$ would not be used.

Figure 3A:
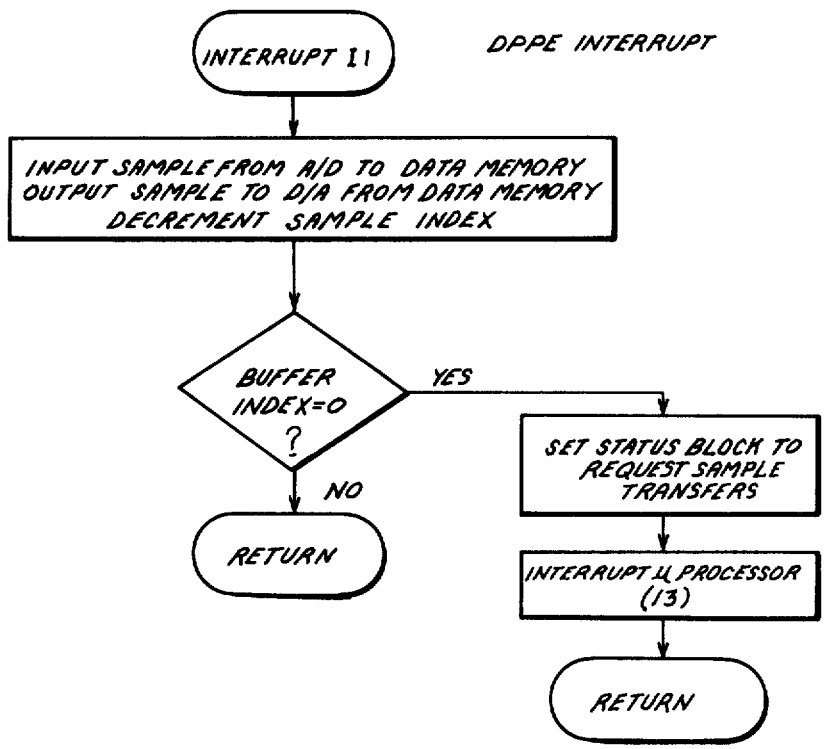
FIG. 3a is a flow chart depicting a first interrupt routine for the DPPE.

FIG. 3a depicts the flow chart determining operations of the $I_1$ interrupt. Thus from FIG. 3a it is seen that when the $I_1$ interrupt is applied to the timing and control, the DPPE takes the input sample from the A/D converter 74 and transfers the same to the data memory via the input register 71. The contents of the output register 70 would take an output sample from the data memory and transfer it to the output register 70 and then to the D/A converter. At the end of this operation the index registers associated with the buffers 70 and 71 are sampled to see whether the data has been transferred. If it has been transferred the status lead is set to request additional transfers. To do this, the microprocessor is interrupted by a high level on the $I_3$ interrupt. Thus as one can see from FIG. 3a the logic and sequence of operation is clearly explained in the flow chart.

Figure 3B:
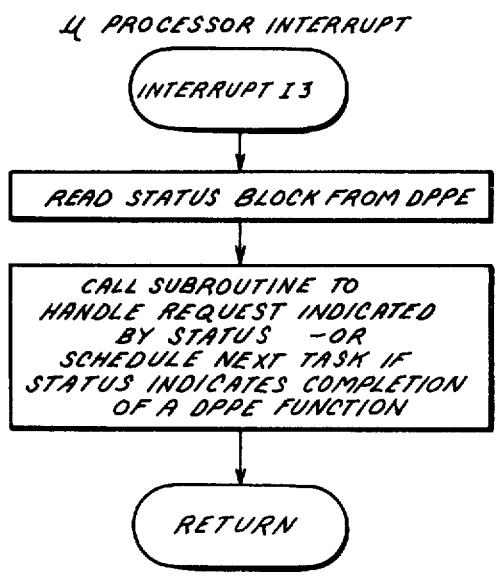
FIG. 3b is a flow chart depicting a microprocessor interrupt.

FIG. 3b shows a flow chart for a microprocessor interrupt $I_3$ which microprocessor will read the status block from the DPPE. Based on the data in the status block the microprocessor will perform the subroutine indicated by the status request or schedule a next control task if the status indicates a completion of a DPPE function.

Referring back to FIG. 2, in the voice processor, the interrupt $I_1$ signals the DPPE 100 that an input sample is available from the A/D converter 106. This sample is input to the DPPE data memory 41 and that an output sample is also required by the D/A converter 107 which is output from the data memory.

The index to the sample store in the data memory is decremented and tested for zero. A common index and two base addresses are used to separate input and output samples. If the index has not reached zero, the interrupt routine is exited. If the index is at zero, the input buffer 71 is full and the output buffer is empty. This status is entered in the status block in the DPPE's output buffer and the microprocessor is interrupted with an $I_3$ requesting service.

In response to the $I_3$ the microprocessor reads the status block from the DPPE and calls the appropriate subroutine to handle the request. The DMA 104 is set to transfer the input samples from the DPPE to the microprocessor memory. The DPPE is then commanded to set up the sample transfer by inputting the instructions via the input buffer and then alerting the DPPE with the interrupt $I_2$. As seen from the flow chart of FIG. 3c, the interrupt $I_2$ is a general routine in which the DPPE examines the input buffer for the task to be executed.

Figure 3C:
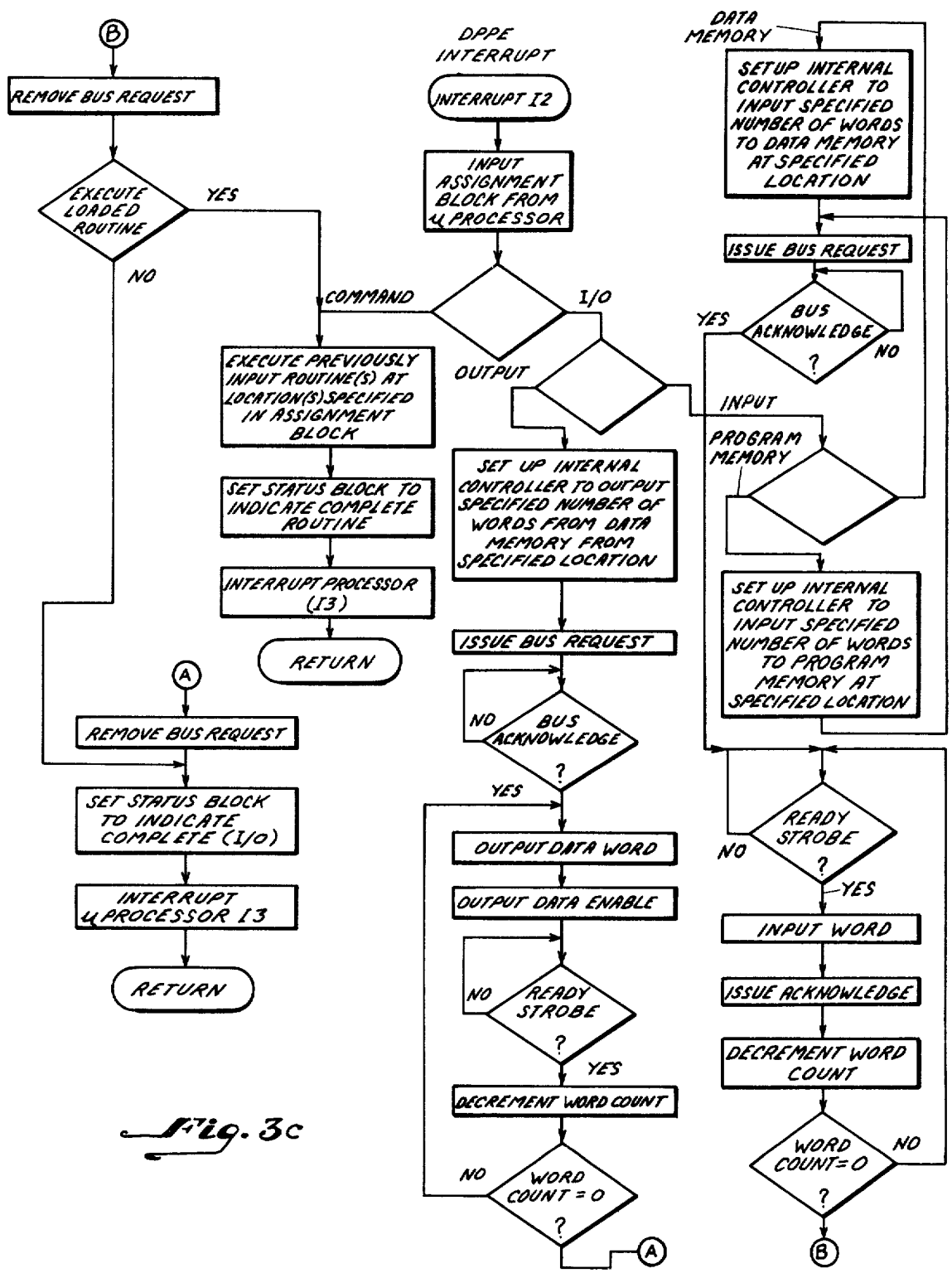
FIG. 3c is a flow chart depicting a second DPPE interrupt.

The flow chart of FIG. 3c is the logic and sequence of operation of the $I_2$ interrupt. If the instruction is to execute a previously input program, the DPPE proceeds to run the program, then indicates the completion of the program in the status block and interrupts the microprocessor according to FIG. 3b. If the instruction is an I/O instruction, a test is made to determine whether it is input or output. If it is an output, only the data memory is affected, the internal control routine is set up to output the specified block of data via the output register 70. The DPPE 100 issues the bus request signal and waits for the bus acknowledge from the microprocessor. The data word is then output from the DPPE, the data enable signal is then output and the data is held until the ready strobe is input by the DMA. The word count in the DPPE is decremented and tested and the output cycle is repeated until the word count reaches zero. The DPPE then removes the bus request, enters the ending status in the output buffer 70 and interrupts the microprocessor with the $I_3$ interrupt.

If the I/O operation is an input, the instruction is further examined to see if it is a program or data memory input request and the appropriate internal data paths are enabled to load the appropriate memory as either the program memory or the data memory. The DPPE issues the bus request when it is ready for the I/O and waits for the bus acknowledge (80 and 81 of FIG. 1). The DPPE then waits for the ready signal, inputs the word at the data port, issues the acknowledge strobe, decrements and tests the word count and repeats the input cycle if the word count is not zero. When the word count reaches zero, the DPPE removes the bus request and examines the input assignment block to see if also a program is to be executed. If the program is to be executed the procedure is the same as with the input command. If a program is not to be executed the status block is updated and the microprocessor is interrupted with the interrupt $I_3$.

Figure 4A:
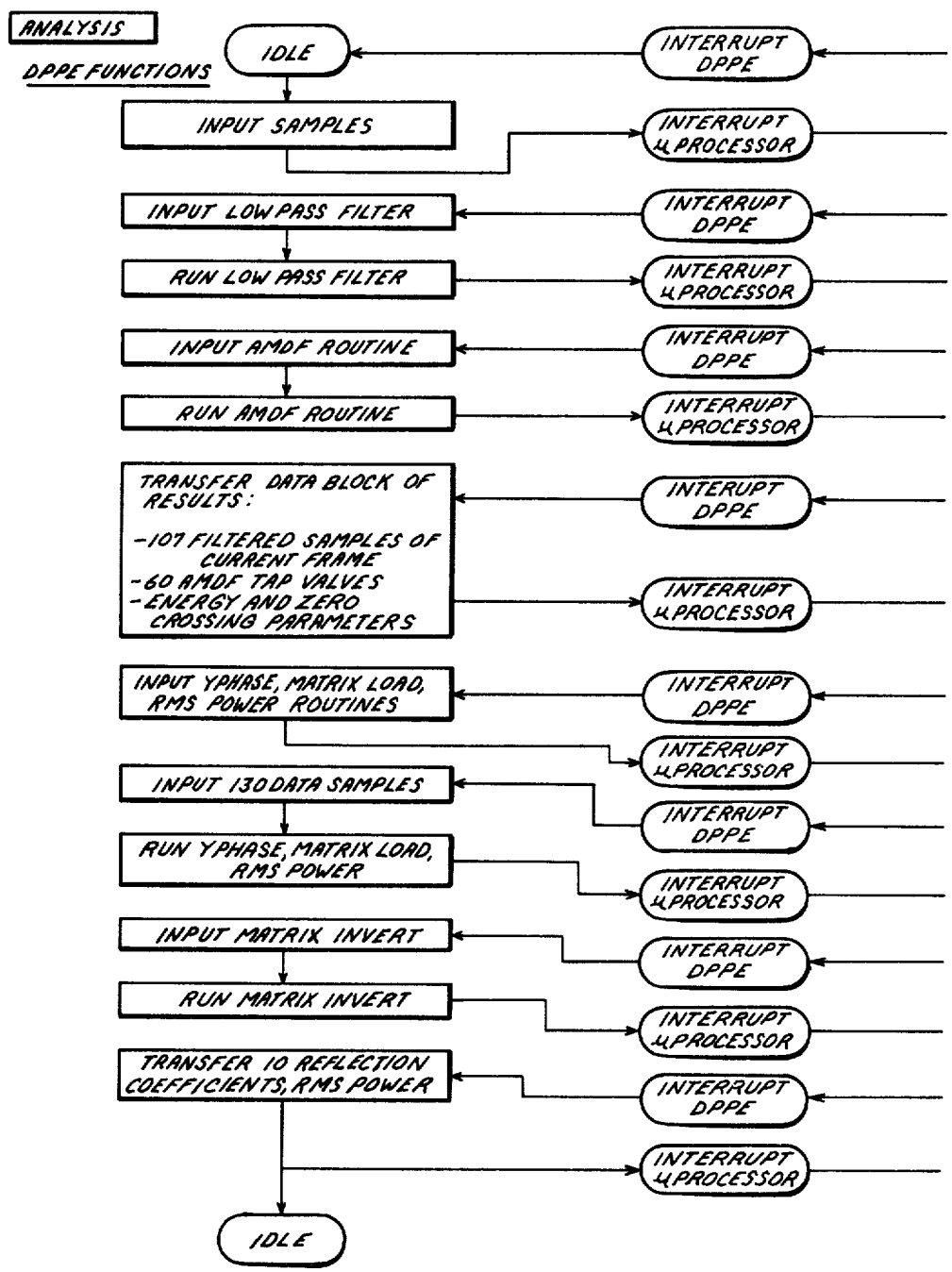
FIGS. 4a and 4b are a flow chart depicting functional operation between a DPPE and microprocessor for performing an analysis portion of a LPC procedure.
Figure 4B:
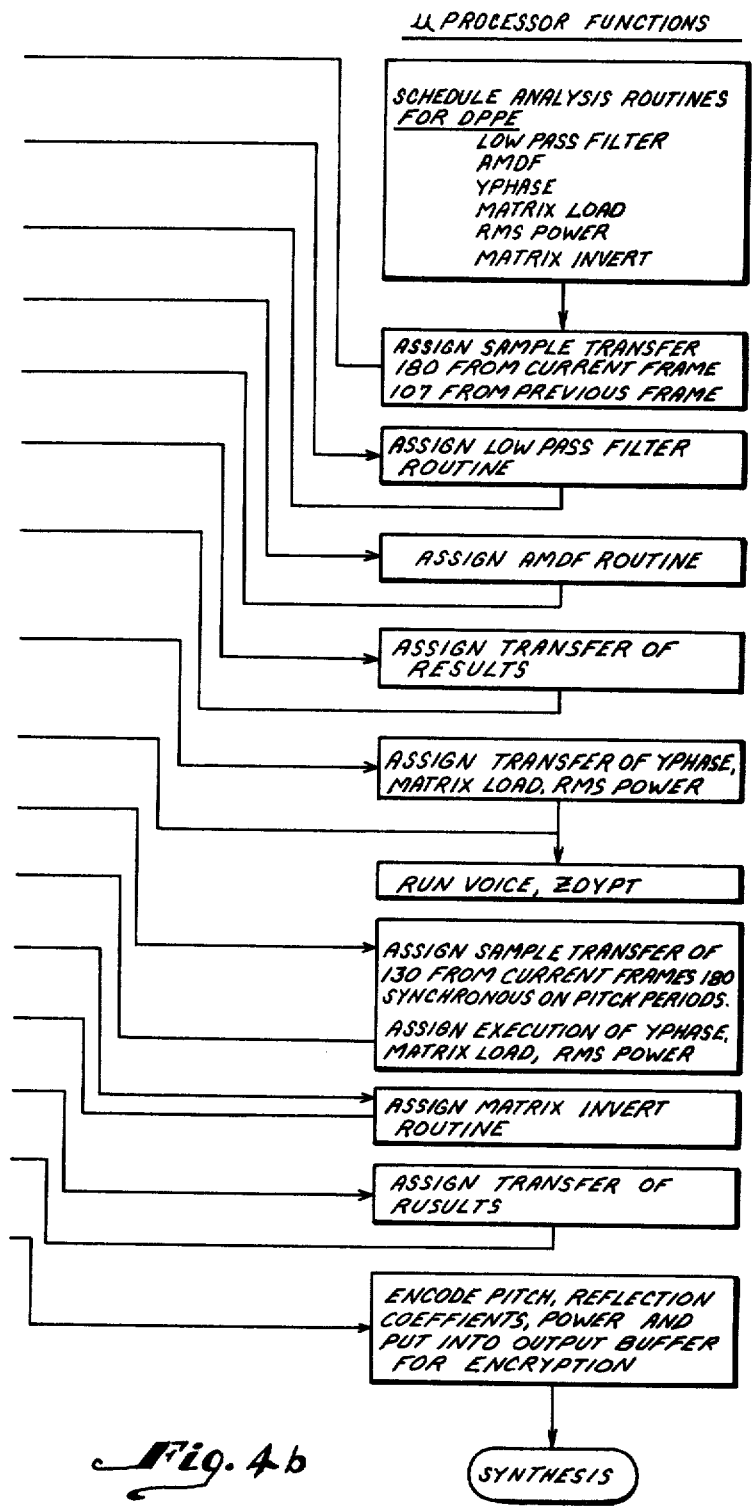

Referring to FIG. 4 there is shown a flow chart of DPPE and microprocessor interaction in the performance of the analysis portion of LPC. The level of detail depicted in FIG. 4 is shown on a major subroutine level. All interruptions between the DPPE 100 and the microprocessor 101 are processed as shown in FIG. 3 and as explained above.

The microprocessor 101 first schedules the major routine to be performed by the DPPE. The microprocessor then assigns the DMA 104 and the DPPE 100 to transfer 287 digitized voice samples from the memory to the DPPE, 180 samples from the current frame, and 107 low pass filtered samples from the previous frame. The DPPE is idle at this time and when interrupted proceeds with the data transfer and interrupts the microprocessor 101 upon completion.

The microprocessor 101 assigns the low pass filter routine to be transferred to the DPPE and then implements and interrupts the DPPE 100. The DPPE inputs the routine and runs the low pass filter routine which low pass filters the 180 samples from the current frame and then interrupts the microprocessor 101. The microprocessor 101 assigns the absolute magnitude difference funtion (AMDF) routine to be transferred and run and interrupts the DPPE 100. The DPPE 100 inputs the AMDF routine and then runs it which extracts 60 tap values from the 180 new sample values plus 107 old sample values by summing the absolutes magnitude of the difference of samples varying distance apart in time.

The 60 taps are logarithmically spaced time intervals, representing 60 possible pitch periods.

The minimum values of the 60 taps is used to calculate the pitch of the input voice signal. This technique is well-known in LPC voice processing. The AMDF routine is a commonly used procedure to get pitch data from voice. As part of this routine energy and zero crossing parameters are also extracted which are also used in the pitch calculation and voiced/unvoiced decision. At the end of this execution of AMDF, the DPPE interrupts the microprocessor which assigns the transfer of the results from the DPPE and then interrupts it.

The data transferred are the last 107 low pass filtered samples from the current frame for use in the next frame, the 60 tap values and energy and zero crossing parameters. At the end of the transfer, the DPPE interrupts the microprocessor. The microprocessor 101 assigns the transfer of y phase matrix load, and rms power routine to the DPPE and interrupts it. The DPPE inputs these routines and at the same time the microprocessor runs the voice routine which makes the voiced/unvoiced decision and calculates possible pitch periods. The microprocessor then runs the zdypt routine which uses dynamic programming to select the most likely pitch period based on current and past estimate of pitch.

The data is used to select the 130 samples of the current frames 180 samples which are synchronous to pitch periods and then the microprocessor assigns these samples to be transferred to the DPPE and commands the execution of the three previously input routines and interrupts the DPPE. The DPPE inputs the 130 samples, runs y phase, matrix load and rms power which, in general, pre-emphasize the samples, generates a 10×10 covariance matrix and a 10 point auto-correlation vector and measures the rms power of the samples.

The DPPE then interrupts the microprocessor which assigns the matrix invert routine to be input to the DPPE and interrupts it. The DPPE inputs the matrix invert routine and runs it. This routine, in general, solves for the 10 reflection coefficients used in the synthesis filter by inverting the covariance matrix by Cholesky decomposition. The procedure is commonly used in LPC implementations. For example, see the following articles: A LEVEL COMPLETING DYNAMIC TIME WARPING ALGORITHM FOR CONNECTED WORD RECOGNITION by C. S. Myers and L. R. Rabiner, IEEE Transactions on Acoustic Speech and Signal Processing, Volume ASSP-29 No. 2, April 1981. See also an article entitled ON THE USE OF DYNAMIC TIME WARPING FOR WORD SPOTTING AND CONNECTED WORD RECOGNITION by C. S. Myers, L. R. Rabiner and A. E. Rosenberg, published in the Bell Systems Technical Journal, Volume 60, March 1981, No. 3.

These articles are related to LPC and voice recognition in general. After solving for the 10 reflection coefficients the DPPE interrupts the microprocessor which assigns the transfer of results from the DPPE and interrupts it. The DPPE transfers the 10 reflection coefficients and rms power measurements and interrupts the microprocessor and goes to the idle state. The microprocessor encodes the pitch data reflection coefficients and power measurements along with the voiced/unvoiced decision for serial transmission to the encryption process and goes on to perform the synthesis function.

Figure 5:
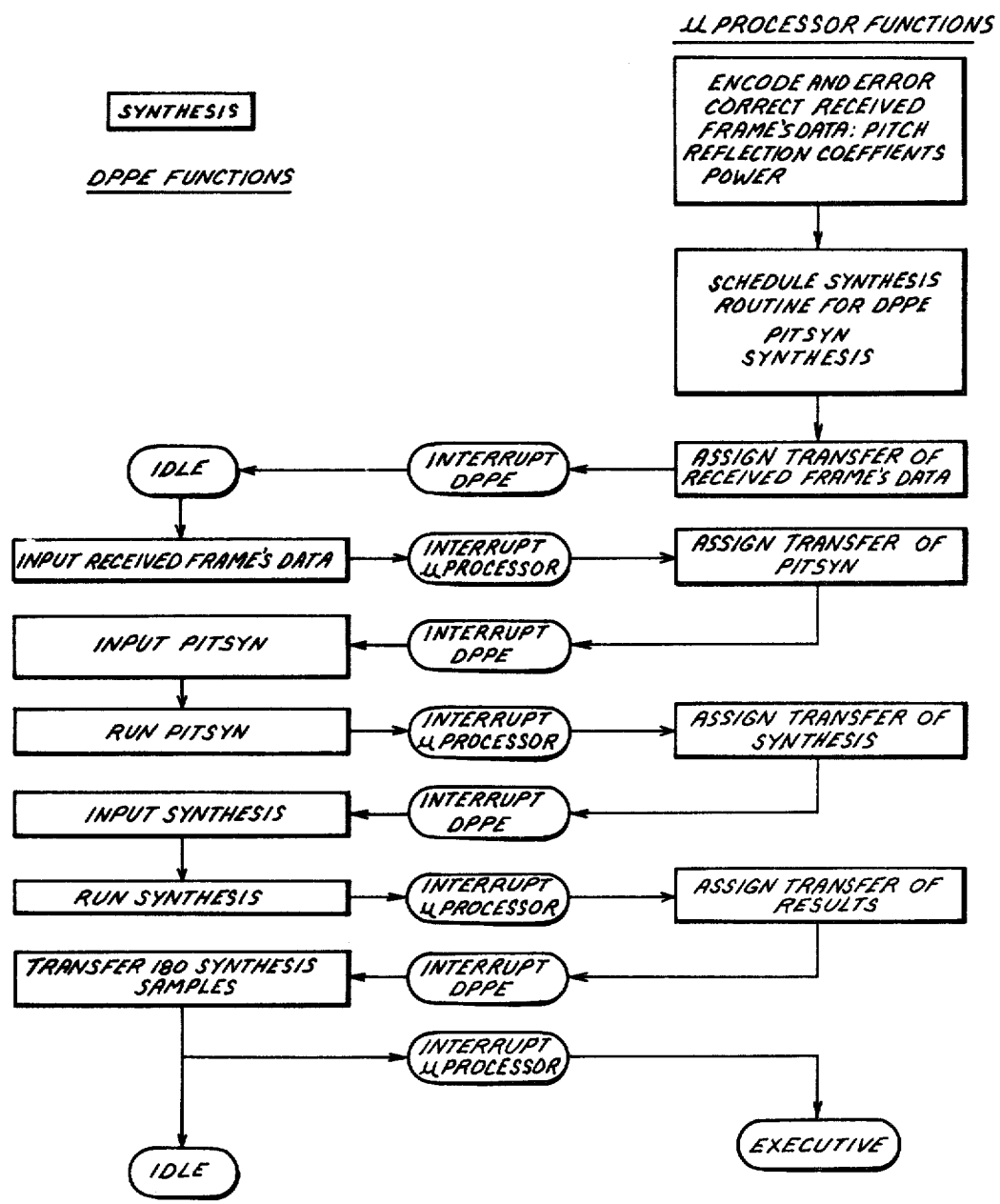
FIG. 5 is a flow chart of a DPPE and microprocessor function for performing a synthesis portion of a LPC procedure.

Referring to FIG. 5, there is shown in flow chart depicting the DPPE and microprocessor interaction in the execution of the LPC synthesis function. The microprocessor encodes and error corrects the receive frame's data, pitch, reflection coefficients, power and voiced/unvoiced decisions, then schedules pitsyn, and synthesis routines to be executed in the DPPE and assigns the transfer of the received data to the DPPE and interrupts the DPPE. The DPPE inputs pitsyn and then runs its routine which in general generates the exitation for the synthesis routine in several epochs synchronous to pitch periods. This generation is for one frame consisting of pseudorandom noise in the unvoiced case or impulses based on the pitch period in the voiced case.

The DPPE then interrupts the microprocessor which assigns the transfer of the synthesis routine and generates 180 samples of synthesized voice data using the exitation generated by pitsyn and the 10 reflection coefficients for the synthesis filter.

The DPPE interrupts the microprocessor which assigns the transfer of the results and interrupts the DPPE. The DPPE transfers the 180 generated samples, interrupts the microprocessor and goes to the idle state. The microprocessor returns to its executive routine. The operation for both the analysis and synthesis of the DPPE and a microprocessor in operating to implement a linear predictive code is shown in FIGS. 4 and 5 in flow chart form.

Thus the DPPE, as shown in FIG. 1, operates with the microprocessor in the orientation depicted in FIG. 2. The ability of the DPPE to implement program change and to allow data to be stored in memory, enables the DPPE to be programmed in real time. Thus it can perform different arithmetic and control functions the sum of which exceed the program and data memory capacity of the microprocessor, as well as of the DPPE.

In this manner, the DPPE can execute instructions by fetching them from the microprocessor or from an external memory. This feature is useful where the length of the instruction sequence is shorter than the time required to load the sequence into the internal program memory having a faster execution.

Since the DPPE can be reprogrammed in real time by a host processor or by accessing a local external memory it can substantially increase the efficiency of the microprocessor and reduce the length of time required to implement the LPC or other complicated digital processing techniques.

The above noted example of LPC processing was given to show the unique characteristic of the DPPE and how it can be employed in conventional systems to aid in performing difficult digital processing routines. It should be understood by those skilled in the art that the DPPE structure as shown in FIG. 1 has wide spread utility apart from the particular environment of a voice terminal and so on.

Thus, all such uses of the structure are deemed to be encompassed within the spirit and scope of this invention as defined by the claims appended hereto.

We claim:

1. A dynamically programmable processing element (DPPE) particularly adapted for use in processing digital signals and having the ability to receive data and program instructions from an external source comprising:

a program bus connected to said external source for transmitting and receiving program data from said external source,
  a data bus for transmitting and receiving digital data,
  input and output registers coupled between said data bus and said program bus for storing transmitted or received data present on either bus,
  a program memory having an input coupled to said program bus and means coupling the output of said program memory to said program bus,
  a data memory having addressable input means coupled to said program bus and an output coupled to said data bus, whereby said program memory can receive program information from an external source and data from said data memory can be transferred to said external source.

2. The DPPE according to claim 1 further including a serial input/output register having a first input/output bus coupled to said program bus and a second input/output bus coupled to an analog to digital converter.

3. The DPPE according to claim 1 wherein said addressable input means of said data memory includes an address register means having an input coupled to the address input of said data memory for accessing data stored in said memory in two storage locations to cause two operands to be applied to said data bus.

4. The DPPE according to claim 3 further including an adder/subtractor means coupled to said address register for modifying the address stored therein, and a constant memory coupled to said adder/subtractor means for modifying said address by a stored constant.

5. The DPPE according to claim 3 further including multiplier means having an input coupled to said data bus for providing at an output the products of said two operands.

6. The DPPE according to claim 5 comprising an arithmetic logic unit (ALU) having one input coupled to the output of said multiplier and another input coupled to said data bus for providing at an output a signal manifesting an arithmetic relationship between two operands.

7. The DPPE according to claim 6 further comprising an accumulator having an input coupled to the output of said ALU.

8. The DPPE according to claim 7 further comprising gating means coupling the output of said accumulator to said data bus.

9. The DPPE according to claim 1 wherein said program memory has a first section comprising a memory section for storing a loader program which controls the loading of program instructions and data from said external source and a second section which is loaded from said external source for storing the operating program.

10. The DPPE according to claim 1 further including timing and control means coupled to said program bus and said data bus and operative to provide a series of control signals for communicating with said external source and for controlling said program and data memories.

11. The DPPE according to claim 10 further including a loop counter having an input/output bus coupled to said data bus and an output bus coupled to said timing and control means.

12. The DPPE according to claim 1 further including a data/address bus having one end coupled to said program bus and the other end coupled to said external source.

13. The DPPE according to claim 12 wherein said external source is a memory.

14. The DPPE according to claim 12 wherein said external source is a microprocessor.

15. The DPPE according to claim 1 wherein said data memory has a data input coupled to said data bus via a data delay register.

* * * * *